Patented Jan. 19, 1932

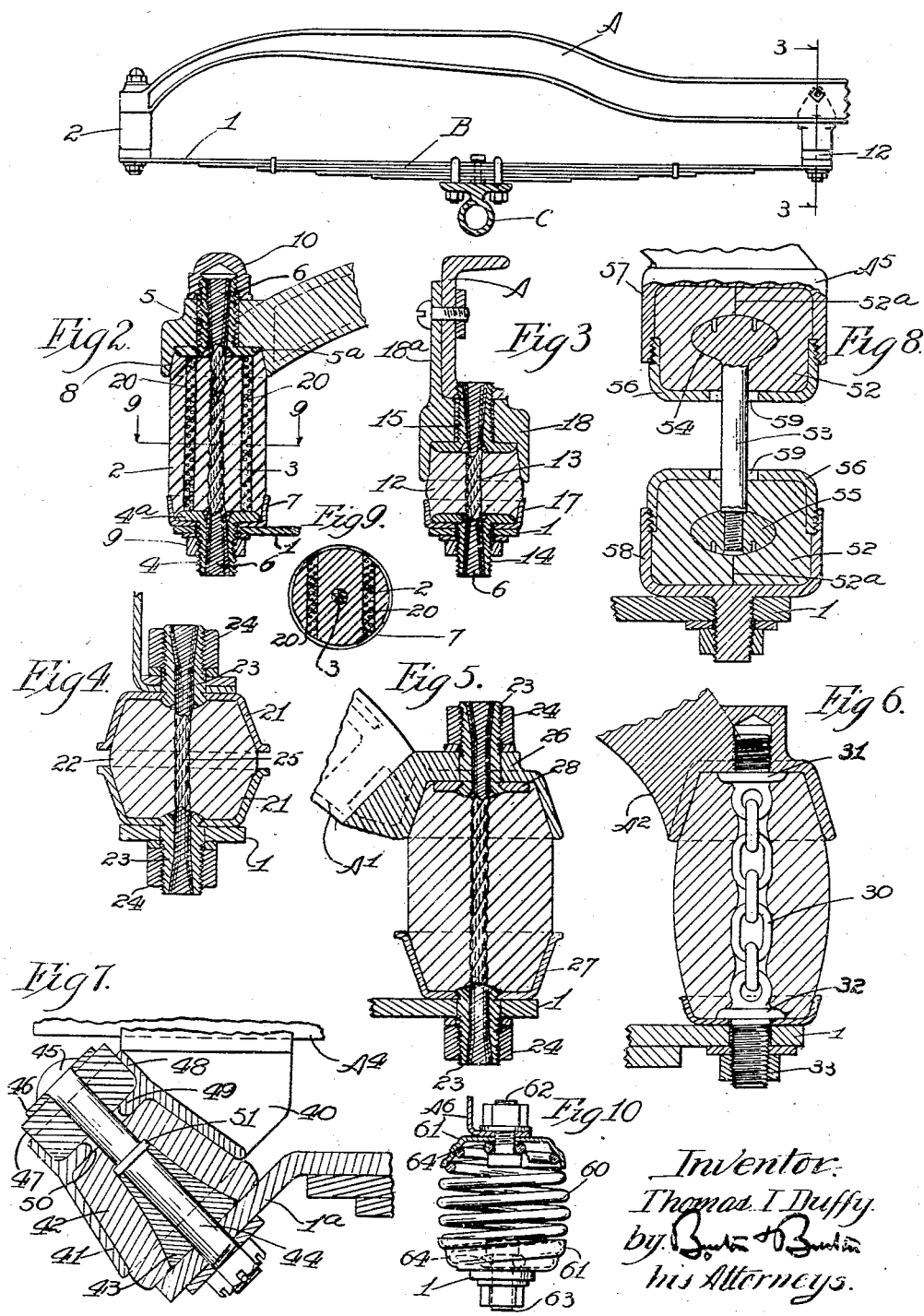

1,841,795

UNITED STATES PATENT OFFICE

THOMAS I. DUFFY, OF CHICAGO, ILLINOIS, ASSIGNOR OF ONE-HALF TO J. CORT WALKER, OF CHICAGO, ILLINOIS, AND ONE-HALF TO ROBERT N. BURTON, OF CHICAGO, ILLINOIS

VEHICLE SPRING SUSPENSION

Application filed March 31, 1924. Serial No. 703,016.

The purpose of this invention is to provide improved means for connecting two members having limited relative movement, as for example the frame and supporting spring of a vehicle and the object of the invention is to permit the use of rigid attaching means while providing the required play or flexibility in the connection itself, thus avoiding the use of parts liable to become loose or noisy with wear. The invention consists in certain features and elements of construction in combination as herein shown and described and as indicated by the claims.

In the drawings:—

Figure 1 is a side elevation of a vehicle spring and a portion of a vehicle frame to which it is attached by means embodying this invention, the view being taken from the inner side of the frame and therefore showing the axle in section.

Figure 2 is a vertical section on a larger scale taken at a medial longitudinal plane on Figure 1.

Figure 3 is a detail section taken as indicated at line 3—3 on Figure 1.

Figure 4 is a detail section of a modified construction corresponding to that shown in Figure 3.

Figure 5 is a detail section showing the companion structure to that of Figure 4 as designed for use at the end of the vehicle frame.

Figure 6 is a detail section illustrating a further modification corresponding to that of Figure 5.

Figure 7 is a vertical detail section of another modified form.

Figure 8 is a vertical detail section of another modified form of the invention.

Figure 9 is a transverse section taken as indicated at line 9—9 on Figure 2.

Figure 10 is a detail elevation partly in section showing a modified form using a metallic coil spring as the flexible connector.

It is well known that in motor vehicles as at present constructed for travel upon ordinary roads the metallic pivoted links known as "shackles" by which the ends of the leaf springs are connected to the vehicle frame or in some arrangement to the axle are comparatively difficult to keep properly lubricated and are therefore subject to rapid wear and deterioration; as a result the running car develops squeaks and rattles after a few months of use on the roads and the elimination of this noise involves replacement of many small parts. My invention looks to the substitution of a flexible connecting member, and preferably I use an elastic material such as rubber for providing the required flexibility in the connection between the vehicle spring and the frame, employing such material in compression between the connected parts, and associating with it an element of substantially inextensible material such as a metallic member arranged in tension between the connected parts and serving to retain the compressible member in place. The principle of my invention will be most readily understood after a consideration of one or more of the embodiments thereof shown in the drawings.

In Figure 1 a portion of the vehicle frame member is shown at A, and below it is illustrated a common type of leaf spring, B, whose longest and upper leaf, 1, serves for attachment of the spring to the frame member, A, while the axle, C, is clipped to a part of the spring intermediate its length at its thickest portion. Between the rear end of the frame and the leaf, 1, of the spring a cylindrical block of rubber, 2, is interposed with a wire cable, 3, extending axially through it and provided with threaded terminals, 4 and 5, extending respectively through apertures in the spring leaf, 1, and in the terminal portion of the frame member, A. Each of the fittings, 4 and 5, has a slightly conical bore in which the strands of the cable, 3, are spread apart and held wedged by the addition of a quantity of solder or spelter introduced in molten condition and indicated at 6. This is a familiar expedient for providing a threaded terminal for wire rod or cable and it may be understood that in the present instance the cable is thus anchored in the terminals, 4 and 5, while said terminals are assembled with the rubber block, 2, under an initial compression approximately equal to the normal load to be sustained by the block when assembled in the vehicle so that when it is thus assembled the rubber block will not be further compressed except by additional or temporary load tending also to flex the spring, B, from its normal shape. The flanges, 4ª and 5ª, of the fittings 4 and 5, engage the opposite ends of the block, 2, for transmitting the initial compression thereto and for holding the block in shape under tension of the tie member or cable, 3. Preferably a cup shaped fitting, 7, is applied over the flange, 4ª, and the terminal portion of the frame member, A, is provided with a downwardly opening cup at 8 to confine the end portions of the rubber cylinder, 2, and overcome any tendency of the cylinder to become split or frayed in use. The end portion of the spring leaf, 1, is clamped against the cup, 4ª, by any suitable form of nut at 9 and as shown, an ornamental nut, 10, is applied to the threaded terminal, 5, protruding through the terminal cup, 8, of the frame, A.

Figure 3 shows in detail the connector employed at the forward end of the spring, B. This end of the spring is considered substantially fixed to the vehicle frame, it being the intention that the lengthening or shortening effect of the spring flexure shall be accommodated principally at the rear end by bending of the rubber block, 2, and its contained flexible cable, 3. Therefore the rubber cushion block, 12, at the forward fitting is made much shorter than the block, 2, and its cable, 13, is of correspondingly reduced length. The fittings, 14 and 15, are substantially like the fittings, 4 and 5, the latter being shown as screwed directly into the lower flange of the frame channel, A, through a specially formed casting, 18, having a downwardly open cup to receive the cushion block, 12, and an upwardly extending flange, 18ª, molded against the side of the frame, A. At the lower end the threaded fitting, 14, penetrates an aperture in the end of the spring leaf, 1, exactly as at the rear end of the spring and is clamped in position by a nut.

Since the flexure required of the block, 2, is mainly in a vertical plane fore-and-aft of the vehicle and lateral flexure is required only when the wheel at one end of the axle, C, rises higher than the wheel at the other end of the axle or drops lower on rebound, it is desirable to check any tendency to "sidesway" by molding in the block 2, strips, 20, 20, of cord webbing which may be similar to that used in cord tires, these strips extending in transverse planes as indicated in Figures 2 and 9 with their cords crossing each other in vertically oblique directions and thoroughly embedded in the rubber thus rendering it practically inextensible requiring any lateral flexure to be by way of compression at one side of the cylinder without expansion of the other side. In many cases the reinforcements, 20, will not be necessary and may be omitted without detracting from the spirit of the invention.

Figure 4 represents a slightly modified design of the parts corresponding to those shown in Figure 3. In this case the cups at both ends of the rubber blocks, 22, are formed as stampings, 21, and the threaded fittings, 23, are riveted into the cups, 21, and provided with nuts, 24, for clamping them respectively to the spring leaf, 1, and to the flange of the frame channel. In this design the fittings at opposite ends of the block, 22, are exact duplicates thus simplifying the manufacturing problem. The cable, 25, is secured in the fittings, 23, in the same manner as in the previously described structures. Figure 5 shows the same type of design applied to the fittings for the end of the frame. The frame channel is shown at A¹ supporting a special forge terminal, 26, which provides the cup for the upper end of the rubber block while a stamped cup, 27, quite similar to the cups, 21, is provided at the lower end associated with a threaded terminal, 23, and nut, 24. A similar terminal fitting and nut are shown at the upper end of the cable but since the cup is formed in the forging, 26, a plain washer, 28, is secured to the terminal fitting, 23, within the cup.

Figure 6 shows a further modification for which a short chain, 30, is substituted for the wire rod or cable within the rubber block and terminal links, 31 and 32, formed with outwardly facing flanges and threaded end portions are secured respectively into the end of the frame member, A², and through the hole in the end of the spring leaf, 1, and nut, 33, being applied at the latter point. It will be seen that the chain meets the essential requirements in being substantially inextensible though readily flexible with any flexure of the rubber block caused by longitudinal movement of the end of the spring leaf, 1.

Figure 7 shows another modified embodiment of the invention as applied to the forward end of a rear spring or the rear end of a front spring directly under the vehicle frame, A⁴. In this case the extreme end of the longest spring leaf is bent at 1ª, to extend obliquely downward from the body of the spring and a special fitting, 40, provides a downwardly open cup, 41, whose axis is so inclined as to be substantially perpendicular to the upper face of the part, 1ª. A rubber cushion block, 42, is carried in the cup, 41, and extends in contact with the spring terminal, 1ª. This block is formed with a conical bore, to receive a conical plug, 43, on a tie bolt, 44, which extends axially through the block, 42, and whose head, 45, fitted with a washer, 46, is lodged upon a yielding cushion block, 47, preferably also of rubber so that while the tie bolt, 44, is not itself flexible it can swing in this flexible mounting to provide the necessary accommodation for the end of the spring. The cushion block, 47, is lodged in a cup, 48, whose bottom is formed by an annular internal flange, 49, formed with a clearance opening, 50, around the bolt, 44. For holding the rubber parts, 42 and 47, in assembled relation in the fitting, 40, before attachment of the spring end, 1ª, a tight collet, 51, may be driven into the bolt, 44, to the upper end of the clearance space provided for the plug, 43.

Figure 8 shows a further modification in which the rubber cushioning element does not fill the space between the frame and the spring end but is divided into two sections. The frame end, A⁵, is formed as a downwardly open cup housing a block of rubber, 52, and a rigid tie rod, 53, formed with dumbbell ends, 54 and 55, is shown with the forward end pocketed in the central recess in the block, 52. Assembly of these parts is rendered possible by splitting the block, 52, vertically at 52ª, at one side of its central recess to admit the head, 54, of the tie rod, 53, before the block, 52, is inserted in the cup of the frame end, A⁵. When so inserted the block, 52, is retained in the cup, 57, by a mated threaded cup, 56. A cup, 58, is attached by a central threaded stem to the spring leaf, 1, and its rubber cushion block, 52, is similarly inserted and retained by its mating cup, 56. The parts, 56, are formed with central clearance apertures, 59, around the rod, 53, and are assembled on said rod before the blocks, 52, are secured in place, the lower head, 55, of the rod being detachable by virtue of a threaded engagement with the end of the rod, 53, as shown. It may be understood that in screwing the caps, 56, in place the rubber blocks, 52, are compressed to the desired initial degree corresponding to the normal load carried by the fitting in the assembled vehicle and that additional load is transmitted through the dumbbell heads, 54 and 55, to further compress the rubber. With this arrangement, however, the rod, 53, itself acts normally in compression and serves as a tie member only as against the recoil of the spring. However, the flexibilty of the rubber blocks, 52, permits of angular movement of the rod, 53, with respect to its anchorage in the frame and to the spring thus accommodating the fore-and-aft movement of the spring leaf, 1, as the vehicle spring flexes and straightens with up and down movement of the axle in road travel.

Figure 10 shows a modified form of the invention in which the use of rubber is dispensed with and a coiled spring, 60, provides both the cushioning effect and the lateral flexibility which the combination of rubber and a flexible metal tie affords in most of the other forms illustrated. Finishing caps, 61, are applied to the upper and lower ends of the spring, 60, and said ends of the spring are attached rigidly to the frame, A⁶, and the spring leaf, 1, by bolts, 62 and 63, respectively. For close engagement with these bolts the end portions of the spring are bent to form small axially located eyes, 64, which are clamped against the heads of the cup, 61, by the bolt heads.

I claim:—

1. The combination of a block of elastic cushioning material, a vehicle frame and spring, a flexible tie member engaging said block from opposite directions independently of said frame and spring, and means connecting said frame and spring respectively to opposite ends of said tie member.

2. The combination of a block of elastic cushioning material, a flexible tie member having means engaging opposite sides of said block and holding it compressed, a vehicle frame and spring and means connecting them respectively to opposite ends of said tie member.

3. In combination with a vehicle frame and supporting spring, means for connecting said spring to the frame comprising a block of elastic cushioning material, a flexible tie member engaging opposite sides of said block and holding it under an initial compression substantially equal to the normal load of the vehicle to be carried by the spring at the point of connection and means securing the tie member to the frame and spring respectively with the cushioning block interposed between them.

4. In combination with a vehicle frame and vehicle spring, a body of elastic cushioning material disposed for compression between said parts and a substantially inextensible flexible tie member extending through said cushion with its opposite ends secured respectively to opposite ends of said cushioning body and to said parts.

5. The combination of a cylindrical block of elastic cushioning material, a flexible tie member extending axially through said block provided with flanges engaging opposite ends of the block, a vehicle frame and spring and means connecting them respectively to opposite ends of said tie member.

6. The combination of a cylindrical block of elastic cushioning material, a flexible tie member extending axially through said block, oppositely facing cupped flanges pocketing opposite ends of the block and tied together by said tie member, a vehicle frame and spring and means securing said flanges respectively thereto.

7. The combination of a block of elastic cushioning material, a flexible tie member extending through said block with oppositely facing flanges engaging opposite ends of the block and held together by said tie member, a vehicle frame and spring, means securing opposite ends of the tie member to said vehicle parts respectively and means opposing flexure of the block and tie member transversely of the length of the spring.

8. In combination with a vehicle frame and spring, a flexible but substantially inextensible connector interposed between said parts and secured to each of them with means opposing flexure of said connector transversely of the length of the spring.

9. In combination with a vehicle frame and spring, yielding cushion means disposed in compression between them and a flexible tie connecting the spring to the frame associated with said means.

10. In combination with a vehicle frame and spring, yielding cushion means disposed in compression between them and a substantially inextensible flexible tie associated with said cushion means and connecting said spring to the frame.

11. Means for connecting a vehicle spring to the frame comprising a block of elastic material, a flexible tie extending therethrough with flanged terminals engaging the ends of the block, said terminals being threaded for securement respectively in the frame and through the leaf of the spring.

12. In the combination defined in claim 11, annular retaining flanges associated with the flanged terminals for pocketing the ends of the elastic block.

13. In the combination defined in claim 11, said elastic block being assembled as a unit on the flexible tie between its flanges under an initial compression approximating the expected normal load to be borne by the spring at the point of connection with the frame.

14. As an article of manufacture a block of yielding material, a flexible tie extending therethrough provided with shoulders between which said block is confined and attaching means rigid with each of said shoulders for securing them respectively to relatively movable members.

15. As an article of manufacture a block of elastic material, a pair of attaching members associated therewith having mutually opposed surfaces between which the block is engaged and flexible means connecting said members.

16. In combination with a vehicle frame and spring, means connecting them comprising a cushion device disposed in compression between them and flexible transversely of the direction of compression, said device including a body of elastic material and relatively inextensible strands in said body disposed in one or more vertical planes transverse to the direction of the length of the spring.

17. Means for connecting a vehicle frame and spring comprising a block of elastic cushioning material interposed in compression between said parts with substantial bearing areas positively attached to said parts, respectively, while the intermediate portion of the block is adapted for yielding distortion to accommodate the movement of the spring with respect to the frame due to spring flexure, said block having sufficient body and inherent stability, transversely of the direction of the load, to offer a retarding resistance to spring movements.

18. In a cushion connection of the character described, the combination with two parts, one of which is to be connected to and supported by the other part, of a block of yielding nonmetallic material, means to connect spaced portions of the block to the respective parts and a flexible, non-metallic link secured to the respective parts.

19. In a cushioning connection of the character described, the combination with two parts, one of which is to be connected to and supported by the other part, of a block of yielding non-metallic material, means to connect spaced portions of the block to the respective parts, and a flexible, non-metallic link embedded within the block and secured to the respective parts.

20. In a cushion connection of the character described, the combination with two parts, one of which is to be connected to and supported by the other part, of a block of yielding non-metallic material, means to connect spaced portions of the block to the respective parts and a flexible, non-metallic link molded with the block and secured to the respective parts to determine the degree of separation thereof.

In testimony whereof, I have hereunto set my hand at Chicago, Illinois.

THOMAS I. DUFFY.